United States Patent
Potenza

(10) Patent No.: US 11,193,877 B2
(45) Date of Patent: Dec. 7, 2021

(54) METHOD FOR THE CHARACTERIZATION OF OBJECTS BY MEANS OF SCATTERED RADIATION ANALYSIS AND RELATED INSTRUMENTATIONS

(71) Applicant: EOS S.R.L., Milan (IT)

(72) Inventor: Marco Alberto Carlo Potenza, Milan (IT)

(73) Assignee: EOS S.R.L., Milan (IT)

( * ) Notice: Subject to any disclaimer, the term of this patent is extended or adjusted under 35 U.S.C. 154(b) by 0 days.

(21) Appl. No.: 16/627,579

(22) PCT Filed: May 18, 2018

(86) PCT No.: PCT/IB2018/053525
§ 371 (c)(1),
(2) Date: Dec. 30, 2019

(87) PCT Pub. No.: WO2019/002960
PCT Pub. Date: Jan. 3, 2019

(65) Prior Publication Data
US 2020/0225142 A1    Jul. 16, 2020

(30) Foreign Application Priority Data

Jun. 30, 2017  (IT) .......................... 102017000073456

(51) Int. Cl.
*G01N 15/14*    (2006.01)

(52) U.S. Cl.
CPC .  *G01N 15/1434* (2013.01); *G01N 2015/1454* (2013.01); *G01N 2015/1493* (2013.01); *G01N 2015/1497* (2013.01)

(58) Field of Classification Search
CPC ....... G01N 15/1434; G01N 2015/1454; G01N 2015/1493; G01N 2015/1497;
(Continued)

(56) References Cited

U.S. PATENT DOCUMENTS 5,104,221 A * 4/1992 Bott .................... G01N 15/0211
  356/336
5,185,641 A * 2/1993 Igushi ................ G01N 15/0211
  356/336
(Continued)

FOREIGN PATENT DOCUMENTS

WO    2006137090 A1    12/2006
WO    2017072360 A1    5/2017

OTHER PUBLICATIONS

International Search Report for International Patent Application No. PCT/IB2018/053525, dated Jul. 19, 2018.
(Continued)

Primary Examiner — Isiaka O Akanbi
(74) Attorney, Agent, or Firm — Cantor Colburn LLP

(57) ABSTRACT

A method for characterizing particle objects comprises generating a radiation beam, illuminating with the radiation beam an observation region transited by a particle object, collecting an interference image determined by an interference between a transmitted fraction and a part of the scattered fraction of the radiation beam that propagates around the direction of the optical axis, collecting a part of the scattered fraction that propagates at the scattering angle, and measuring at least one scattered radiation intensity value determined by the part of the scattered fraction, calculating, from the interference image, a pair of independent quantities that define the complex field of the first part of the scattered fraction, calculating, starting from the pair of independent quantities, a theoretical value of scattered radiation intensity, and comparing the measured value with the theoretical scattered radiation intensity value.

11 Claims, 8 Drawing Sheets

(58) Field of Classification Search
CPC .. G01N 15/1429; G01N 21/51; G01N 15/147; G01N 21/21
USPC .................. 356/335–338, 364, 343, 446
See application file for complete search history.

(56) References Cited

U.S. PATENT DOCUMENTS

| | | | | |
|---|---|---|---|---|
| 5,576,827 | A * | 11/1996 | Strickland | G01N 15/0211 356/336 |
| 9,377,481 | B1 * | 6/2016 | Greenberg | G01P 5/001 |
| 2006/0227324 | A1 * | 10/2006 | Bloom | G01N 15/1459 356/343 |
| 2009/0027670 | A1 * | 1/2009 | Selker | G01N 21/51 356/338 |
| 2009/0079981 | A1 * | 3/2009 | Holve | G01N 15/0205 356/336 |
| 2009/0122315 | A1 * | 5/2009 | Jarrell | G01N 15/0205 356/343 |
| 2009/0290156 | A1 | 11/2009 | Popescu et al. | |
| 2013/0208850 | A1 * | 8/2013 | Schmitt | G01N 23/201 378/4 |
| 2015/0204781 | A1 * | 7/2015 | Wagner | G01N 15/06 356/342 |
| 2016/0266028 | A1 * | 9/2016 | Wyatt | G01N 15/0211 |
| 2017/0241893 | A1 * | 8/2017 | Walls | G01N 15/1436 |
| 2018/0011018 | A1 * | 1/2018 | Kim | G01N 15/06 |

OTHER PUBLICATIONS

Potenza Marco A. C. et al., Measuring the complex field scattered by single submicron particles, Aip Advances, Nov. 11, 2015, pp. 117222/117229, vol. 5, Issue 11, American Institute Of Physics, Melville, NY, USA.

Degiorgio V. et al, Scattering from anisotropic particles: A challenge for the optical theorem?, The European Physical Journal E, Aug. 8, 2009, pp. 379-382, vol. 29, No. 4, EDP Sciences, Società Italiana Di Fisica, Springer-Verlag.

Potenza Marco A. C. et al., Accurate sizing of ceria oxide nanoparticles in slurries by the analysis of the optical forward-scattered field, Journal of Nanoparticle Research, Feb. 28, 2015, pp. 1-8, vol. 17, Issue 2, Springer.

H. C. Van De Hulst, Light Scattering by Small Particles, Part II—Special Types of Particles, Scattering Theory for Spheres of Arbitrary Size, 1981, pp. 121-126, Dover Publication Inc., NY.

Craig. F. Bohren, Donald. R. Huffman, Absorption and Scattering of Light by Small Particles, Chapter 4, Absorption and Scattering by a Sphere, 1983, pp. 82-113, John Wiley & Sons, Inc.

M. A. Yurkin, A. G. Hoekstra, The discrete dipole approximation: An overview and recent developments, Journal of Quantitative Spectroscopy & Radiative Transfer, Jul.-Aug. 2007, pp. 558-589, vol. 106, Issues 2-3, Elsevier.

Barbara J. Frisken, Revisiting the method of cumulants for the analysis of dynamic light-scattering data, Applied Optics, Aug. 20, 2001, pp. 4087-4091, vol. 40, No. 24, Optical Society of America.

Villa et al., Measuring shape and size of micrometric particles from the analysis of the forward scattered field, Journal of Applied Physics, 2016, pp. 224901-224913, vol. 119, Issue 22, AIP Publishing.

M. A. C. Potenza, et al., Shape and size constraints on dust optical properties from the Dome C ice core Antarctica, Scientific Reports, Jun. 16, 2016, Article No. 6:28162, Springer Nature.

C. M. Sorensen, Light Scattering by Fractal Aggregates: A Review, Aerosol Science & Technology, 2001, pp. 648-687, vol. 35, Issue 2, American Association for Aerosol Research, Published by Taylor and Francis.

B. J. Berne, R. Pecora, Dynamic Light Scattering, With Applications to Chemistry, Biology and Physics, Chapters 7-8, 2000, pp. 143-146; 188-192, Dover Publications Inc., NY, USA.

M. A. C. Potenza, et al., Single-Particle Extinction and Scattering Method Allows for Detection and Characterization of Aggregates of Aeolian Dust Grains in Ice Cores, ACS Earth and Space Chemistry, Jul. 20, 2017, pp. 261-269, vol. 1, Issue 5, American Chemical Society.

Written Opinion for International Patent Application No. PCT/IB2018/053525, dated Jul. 19, 2018.

AE Siegman, "Lasers", University Science Books, pp. 663-675 and Fig. 17.7, 1986.

* cited by examiner

METHOD FOR THE CHARACTERIZATION OF OBJECTS BY MEANS OF SCATTERED RADIATION ANALYSIS AND RELATED INSTRUMENTATIONS

CROSS-REFERENCE TO RELATED APPLICATIONS

This application is a U.S. National Phase filing of PCT International Patent Application No. PCT/IB2018/053525, having an international filing date of May 18, 2018, which claims priority to Italian Patent Application No. 102017000073456, filed Jun. 30, 2017 each of which is hereby incorporated by reference in its entirety.

FIELD OF THE INVENTION

The present disclosure relates in general to methods for optical characterization of particle objects.

BACKGROUND OF THE INVENTION

Optical techniques for determining the properties of objects or particles are generally based on the phenomenon of light scattering. Such phenomenon describes the behavior of electromagnetic radiation when it affects an arbitrary object which is polarized and generates in turn said scattered radiation. In general, it is possible that the object does not re-emit all the radiation that has polarized it, due to the phenomenon of absorption. The combination of absorption and scattering is called extinction. It should be noted that, as is well known in the art, the phenomenon of light scattering also comprises diffraction and refraction phenomena, which participate in light scattering and may be used to describe light scattering with good approximation only in particular cases, typically when the size of the object is much greater than the wavelength.

It is well known that scattering and extinction of the electromagnetic radiation by an object are substantially determined by the following characteristics of the object itself: size; composition, which determines its polarization through the polarizability of the material, well described by the quantity known as the refractive index; internal structure, which still affects polarization; shape, and consequently orientation in space with respect to the incidence direction of the radiation, polarization state of the radiation itself and of the direction of observation, and the surrounding medium.

Since all these aspects affect scattering and extinction, optical measurement of particle properties generally requires some assumptions on these aspects. In many cases, one resorts to general hypotheses on which the analysis of scattering or extinction data is based in such a way as to characterize only one of these aspects. Very often the parameter that is determined is the size. This occurs mainly due to well-known industrial requirements, which require, for example, knowledge of the particle size of a powder with known composition and characteristics. It should also be considered that the size of micrometric objects, or, to an even greater extent, sub-micrometric objects, determines in an essential way the properties of interaction of the objects themselves with the surrounding medium and with other materials. It is also important to note in this regard that in the above-mentioned size range, the size of an object represents the parameter on which the amplitude of the scattered radiation is most dependent, due to the lower dependence of the polarization on all the other parameters related to the aspects described above. This statement is valid, provided that objects with particularly extreme parameter values, which could subvert the order of importance in determining the scattering or the extinction of light, are not considered.

Among the most widely used optical methods for determining object properties are multi-angle light scattering techniques, including also low-angle light scattering. These techniques are based on the measurement of the intensity scattered at a plurality of angles by particles impinged by a light beam of a known wavelength, accessing information that is referred to as a static shape factor. The ability to calculate the static shape factors of compact, uniform and substantially spherical-shaped particles is exploited, for example through the Mie theory [1, 2]; or by means of appropriate numerical calculations, which, in principle, also allow to overcome the approximation introduced by assuming the spherical shape or the hypothesis of uniformity [3]. Generally, these techniques are used to measure the size distribution of a particle population; however, by applying them appropriately, it is also possible to derive the refraction index of the material or other parameters. Low-angle scattering is one of the methods mostly used in industry and is a very powerful technique when working with sufficiently concentrated samples, whereas it is generally not applicable to single particles or very diluted samples. This implies that, although it is possible in principle to calculate with great accuracy the static shape factors of any object, the raw data of the instruments is composed of the superposition of many shape factors for each particle simultaneously present within the light beam. Consequently, the interpretation of the data becomes very complex, especially in the case wherein the sample under analysis is represented by objects of very different sizes, one of the most widespread cases especially in industrial applications. The problem is solved through the use of numerical approaches belonging to a class of problems called "inversion" that allow the size distribution of a population of objects to be derived starting from a single static shape factor [4]. The problem becomes even more complex in the case wherein the parameters to show broadened distributions are more than one, as stated above: composition, internal structure, shape and orientation.

In the state of the art, the technique of low-angle light scattering is commonly achieved with the integration of ancillary techniques that facilitate data interpretation. These include measuring light scattered over nearly the entire angular range between 0 and 180 degrees using a large number of sensors.

In addition to this class of methods there is another one which aims to study the radiation scattered by single particles. This choice overcomes all the difficulties described above attributable to the simultaneous measurement of several objects. The same choice introduces an important limitation by requiring analysis of low concentration samples and presenting a difficulty in recognizing and rejecting all the events caused by the presence of two or more objects simultaneously in the beam. Single-particle instruments are divided into two large classes: 1) instruments that measure the light scattered by a single object when it passes through a radiation beam; 2) instruments that measure the light removed by a single object when it passes through a radiation beam. The difference between the two methods lies in whether or not there is access to the absorption properties of the illuminated object. In both cases, the state of the art is represented by instruments that measure only one parameter for each particle. In case 1), a fraction of the power scattered by the object is measured, and a quantity is detected that provides the so-called scattering cross-section, i.e. the ratio between the scattered power and the incident intensity. In case 2), the attenuation of the beam transmitted in the presence of the particle is measured, thus detecting the extinction cross-section of the object, i.e. the ratio between the power removed from the incident beam and the intensity of the latter.

In both cases the instruments, especially if they have high sensitivity to small signals and therefore in general to small particles, suffer from a defect linked to the objective impossibility of detecting the position of the object passing through the beam in the plane orthogonal to the propagation direction of the beam itself. This means that the signal that is revealed may indistinctly be attributed to a small particle that passes through the central part of the light beam, or to a larger particle that instead passes outside of such region. This is often referred to as the "validation problem" and is one of the most critical aspects in interpreting single-particle sensor data. As a result of this problem, in fact, it is necessary to resort to statistical approaches to detect the true size distribution, in effect partially losing the advantage acquired by measuring the single particles. Alternatively, optical validation schemes are developed, which allow to reject signals attributable to particles that have not passed through the central region of the beam. In effect, the applicability of single-particle instruments is limited precisely by the weak ability to detect the properties of the objects under study due to the limited amount of information obtainable from the measured signals and the difficulties of validation.

An improved solution has recently been introduced with a method which is once again based on the measurement of the radiation of the transmitted beam, but which exploits the superposition of the transmitted beam with the scattered wave and a multi-point measurement within the region impinged by the transmitted beam [5, 6]. In this way it is possible to 1) access two parameters related to the scattered wave instead of only one, as in the preceding methods; 2) introduce a rigorous validation method that allows to use the same data to measure the position of the object within the radiation beam, thus allowing a much more detailed analysis of the signals. The access to the two parameters allows for the size and refractive index, or the polarizability, to be obtained, for example, by introducing the hypothesis of spherical and homogeneous objects [7]. This overcomes the limitation imposed in previous methods by the measurement of a single parameter. In general, however, even the measurement of two parameters and a rigorous validation does not allow to reconstruct a set of parameters that exhaust all the aspects that determine the scattering and extinction of light.

An example has been recently reported in the measurement of the shape and size of micrometric particles with a non-spherical shape. This approach consists in orienting the particles in the sensitive volume of the instrument in order to have access to the measurement of a parameter that describes the shape [8]. It should be noted that, in line with what has been stated above, in this case it is necessary to introduce a hypothesis on the refractive index of the objects in order to access the measurement of the shape and the size.

Another example that shows how knowledge on the object may be limited even in the case wherein two independent parameters are accessed is represented by the measurements of objects that have internal substructures, for example, aggregates or core-shell particles, or particles that by their nature present an inhomogeneous structure. In all these cases the hypothesis of homogeneous objects is no longer valid, but due to a general lack of knowledge on the phenomena that take place in determining the polarization of such complex objects, one generally resorts to interpreting the data by assuming to measure homogeneous spheres, the polarizability (or refractive index) of which is in some way linked to the polarizability of the components [9]. It should be noted in this regard that the relationship between the optical properties of the material and those of the inhomogeneous object are still the object of scientific investigation and it is not yet possible to derive the latter from the former [10].

What has been reported so far shows that in general, both in the case of multi-particle instruments and in the case of single-particle instruments, all the aspects that determine the scattering and the extinction of radiation forcefully impose the introduction a priori of assumptions for the interpretation of the data. This is substantially due to the fact that these techniques intrinsically measure only one parameter, or at most two, and that, apart from very special cases, these parameters are not directly linked to the characteristics which one wishes to access. Therefore, precisely because the determination of some properties of objects is forgone, the determination of the size is strongly limited. In general, it is therefore true that the dependence on many parameters of radiation scattering and extinction prevents one from obtaining results independent of hypotheses or models.

SUMMARY OF THE INVENTION

An object of the present disclosure is to provide a method to solve at least in part the problem of the single-particle measurement techniques described above, namely the measurement of too limited a number of parameters, or in any case a number lower than the number needed for a complete knowledge of the object under study.

In view of this aim, the object of the present disclosure is a method for characterizing particle objects, comprising the following steps:

a) generating one or more radiation beams propagating along respective optical axes;

b) illuminating with said one or more radiation beams one or more observation regions that are transited by a particle object, said one or more observation regions being arranged within the Rayleigh zone of the respective radiation beams, wherein a fraction of at least one of the radiation beams, hereinafter scattered fraction, is scattered upon interaction with the particle object transiting in the respective observation region, and another fraction of at least one radiation beam, hereinafter transmitted fraction, is transmitted along the respective optical axis through the respective observation region, without interacting with the particle object transiting in the respective observation region;

c) collecting, at the optical axis of at least one of the radiation beams, an interference image determined by the interference between the transmitted fraction and a part of the scattered fraction that propagates around the direction of the optical axis, hereinafter first part of the scattered fraction;

d) collecting, at at least one non-zero scattering angle relative to the optical axis of at least one of the radiation beams, a part of the scattered fraction that propagates at the scattering angle, hereinafter second part of the scattered fraction, and measuring at least one scattered radiation intensity value determined by said second part of the scattered fraction;

e) calculating, from said interference image, a pair of independent quantities that define the complex field of the first part of the scattered fraction;

f) calculating, from said pair of independent quantities, a theoretical scattered radiation intensity value that would be measured at the scattering angle on the basis of a theoretical model representing the particle object; and g) comparing the actually measured scattered radiation intensity value with the theoretical scattered radiation intensity value.

Another object of the invention is an apparatus for characterizing particle objects, comprising one or more sources for generating respective radiation beams that propagate along respective optical axes, one or more observation regions suitable to be illuminated by radiation beams and suitable to be transited by a particle object, said one or more observation regions being arranged within the Rayleigh zone of the respective radiation beams, wherein a fraction of at least one of the radiation beams, hereinafter scattered fraction, is scattered upon interaction with the particle object transiting in the respective observation region, and another fraction of at least one of the radiation beams, hereinafter transmitted fraction, is transmitted along the respective optical axis through the respective observation region, without interacting with the particle object transiting in the respective observation region;

at least one first sensor for detecting an interference image determined by the interference between the transmitted fraction and a part of the scattered fraction that propagates around the direction of the optical axis of at least one of the radiation beams, hereinafter first part of the scattered fraction;

at least one second sensor for measuring at least one scattered radiation intensity value determined by a part of the scattered fraction that propagates at a non-zero scattering angle with respect to the optical axis of at least one of the radiation beams, hereinafter second part of the scattered fraction; and at least one processing unit configured to:

calculate, from said interference image, a pair of independent quantities that define the complex field of the first part of the scattered fraction;

calculate, from said pair of independent quantities, a theoretical scattered radiation intensity value, which would be measured at the scattering angle based on a theoretical model representing the particle object; and compare the actually measured scattered radiation intensity value with the theoretical scattered radiation intensity value.

The present disclosure resolves, partially or fully, the problem of the single-particle measurement techniques described above, i.e. the measurement of too limited a number of parameters. This allows complete, or more complete characterization methods to be implemented, or that require less information a priori of objects based on scattering and extinction measurements. This differs from the state-of-the-art instrumentation and technologies, wherein a measurement of one or two parameters of an object is obtained on the basis of assumptions on all the other parameters that determine the scattering and extinction of radiation. The present disclosure also applies to the case, already used with the existing methods, wherein one or more parameters relating to several objects of a population are obtained from statistical properties appropriately obtained from the set of parameters measured for each object.

The solution is based on simultaneous measurement of the signals according to the measurement technique described in [5, 6], which will be referred to hereafter as the "first technique", and according to the measurement technique of a substantially relevant portion of the scattered radiation, or a set of portions of scattered radiation in a multiplicity of relevant positions around the sensitive region of the instrument (this measurement will be hereinafter referred to as the "second technique"). In this way, one or more independent parameters are added with respect to the two parameters obtainable according to the scheme of the "first technique". These parameters are determined by the properties of the object under study as previously mentioned. The present disclosure also exploits information relating to the state of polarization of the scattered radiation, compared with the state of polarization of the incident radiation, in reconstructing the parameters that characterize the object.

It should be noted that the measurement of a portion of the scattered radiation relating to one of the "second techniques" leads to the determination of a parameter attributable to the measurement of the scattering cross-section mentioned previously, object of measurement in the traditional, single-particle techniques. Similarly, in the case wherein the state of polarization is measured, the depolarized scattering cross-section is accessed. On the other hand, in the case wherein it is possible to access a multiplicity of measurements distributed angularly around the interaction region, the scheme may lead to the determination of the static shape factor described previously, analogous to the multi-angle scattering techniques. In general, the measurement of one or more scattered intensity values and the corresponding physical parameters obtainable for the object under study and the ratio of such values to each other and with the parameters measurable according to the scheme of [5, 6] provide valuable additional information for the characterization of the object itself.

The measurement of the present disclosure takes advantage of the simultaneous and continuous measurement of the transmitted radiation beam, already present in the "first technique", which allows a continuous determination of the power of the beam incident on the object and leads to the definition of related parameters also for the "second technique", which are easily comparable with the theoretical models for the interpretation of the measurements.

According to one embodiment, the first and second techniques are applied using a single beam radiated over a single sensitive region.

According to other embodiments, the first and second technique are applied using more than one beam (for example, one beam for the first technique and one beam for the second technique, spaced at an angle to each other) simultaneously radiated over the same sensitive region.

According to other embodiments, the first and second techniques are applied using more than one beam radiated over respective sensitive regions (for example, a beam for the first technique radiated over a first sensitive region and a beam for the second technique radiated over a second sensitive region, arranged upstream or downstream of the former). In this way, the information related to the first technique and the information related to the second technique may be extracted in the same observation region, or in different observation regions.

In the present disclosure, information, besides being obtained from the individual particles, is also obtained from the distributions of the parameters measured on several individual particles, as described, for example, in [9].

In the case wherein the measurement is made on several distinct observation regions, in some cases, it is possible to make sure that the measured particle is the same in all the observation regions, while in other cases it is not possible.

In the first case, the method is obviously applied to the single particle, while in the second case, statistical approaches are used to characterize the particle population to obtain the parameters of the first technique and of the second technique.

Further features and advantages of the method according to the present disclosure will become more apparent in the following detailed description, made with reference to the accompanying drawings illustrating non-limiting embodiments of the disclosure.

DETAILED DESCRIPTION

Figure 1:
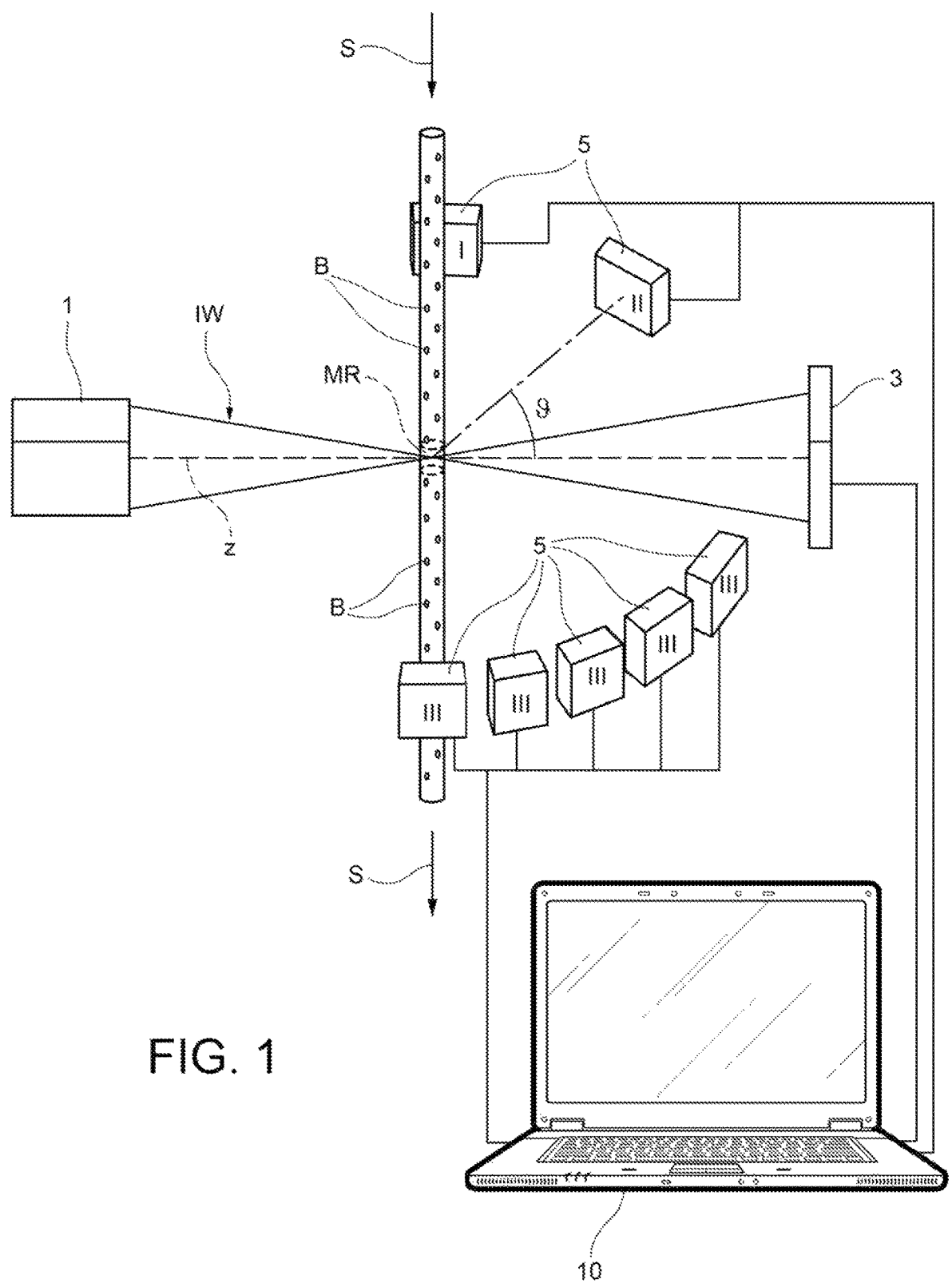
FIG. 1 is a schematic representation of an example of an apparatus capable of carrying out a method according to the disclosure.

FIG. 1 shows a schematic example of an apparatus with which measurements on particles according to the present disclosure may be performed.

With reference to such figure, the apparatus comprises a source of electromagnetic radiation 1, suitable to generate a radiation beam IW which has a frequency range centered around a predetermined frequency co, corresponding to a vacuum wavelength 2. In the direction of beam propagation z, such source 1 may be but is not necessarily followed by a spatial filter and/or beam-forming optics (not shown).

The source 1 preferably emits visible or infrared light and is, for example, constituted by a light-emitting diode or by a semiconductor or other kind of laser, according to the needs of the measurement.

The particles B to be analyzed may be composed of any substance, material or element, solid or fluid (powders, aerosols, drops, bubbles, cells). Such particles pass through the explorer beam IW (according to the direction of the arrow S), transported by a fluid medium or by falling, floating or their own motion or in any other way they may be moved within a region MR illuminated by the beam IW. The fluid medium must be transparent at the frequency (frequencies) of the incident radiation used.

In the case of particles B dispersed in a fluid medium, an appropriate conventional confinement method ensures that only one particle at a time is present in the observation region MR impinged by the beam IW. The MR observation region wherein the particles B are conducted has an amplitude in the direction z of the beam IW which is sufficiently thin to allow the passage of only one particle B at a time in the region MR. For reasons relating to the measurement of phase difference, to avoid ambiguity arising from the phase anomaly, it is appropriate for the particles to cross the beam in the vicinity of the region with the smallest diameter. This condition may, for example be obtained by focusing the beam such that the Rayleigh region is of a length greater or much greater than the thickness of the region MR wherein the particles are conducted. This condition also corresponds to the fact that the size of the beam in the region of smaller diameter is much greater than the wavelength, as is also required by the fact that the beam must be able to uniformly illuminate particles of greater size than the wavelength itself.

A first sensor 3 is arranged on a plane placed at a predetermined distance from the observation region MR and orthogonal to the optical axis z for collecting and recording the radiation coming from the observation region MR. Such detected radiation comprises a part of the scattered radiation generated by scattering interaction of the incident radiation IW with the particle B (hereinafter, also referred to as the first part of the scattered fraction), and a fraction of the incident beam IW, which is transmitted unperturbed through the observation region MR. The device 3 is formed by a plurality of sensor elements able to detect a plurality of electromagnetic radiation intensity values.

The device 3 may be a quadrant sensor the center of which is positioned on the optical axis z of the system. Alternatively, CMOS devices or other devices with a high number of sensitive elements may be advantageously used in embodiments where the analysis of only four intensity values is not sufficient.

The apparatus further comprises at least one second sensor 5 (in the illustrated example, a plurality of second sensors 5) arranged at a predetermined scattering angle θ with respect to the optical axis z. In the illustrated example, the second sensors 5 are arranged according to a two-dimensional arrangement on a plane orthogonal to the transit direction S of the particles B; however, it is possible to conceive of a spatial configuration according to which the second sensors are distributed according to a three-dimensional arrangement.

Each second sensor 5 is adapted to measure at least one respective scattered radiation intensity value determined by a part of the scattered fraction that propagates in the direction of the single second sensor 5 (hereinafter, also referred to as the second part of the scattered fraction) and is then intercepted by such second sensor 5.

The second sensors 5 may include polarizers to select the polarization state of the collected light. The second sensors 5 may be arranged in any space around the focal area of the beam and may include optical devices such as lenses or mirrors for collecting the scattered light.

The apparatus further comprises a processing unit 10, adapted to receive the signals supplied by the first sensor 3 and the second sensor(s) 5 and to process them as follows.

Starting with the interference image made available by the first sensor 3, the processing unit 10 calculates a pair of independent quantities that define the complex field of the first part of the scattered fraction, according to the "first technique" described in [5, 6]. Such quantities may be, for example, the real part and the imaginary part of the amplitude of the scattered field, or any pair of scalar quantities depending on the real part and on the imaginary part of the amplitude of the scattered field.

Starting with the aforesaid pair of independent quantities, the processing unit 10 calculates a theoretical value(s) of scattered radiation intensity which would be measured from the second sensor(s) 5 on the basis of a theoretical model representing the particle object B under study. Such theoretical model is defined on the basis of at least one parameter representing a characteristic relating to the particle object B, for example, size, composition, shape, aggregation state, interaction between particle objects, interaction between the particle object and the surrounding medium.

The processing unit 10 then compares the scattered radiation intensity value(s) actually measured by the second sensor(s) with the theoretical scattered radiation intensity value(s). Such comparison may simply consist in representing numerically and/or graphically the values compared, so as to allow a user to analyze such data and/or store the data in memory, or in other cases may provide for further processing of the data.

For example, the processing unit 10 may be configured to correct one or more parameters of the theoretical model on the basis of the comparison between the scattered radiation intensity value(s) actually measured by the second sensor(s) 5 with the theoretical scattered radiation intensity value(s). The correct values of these parameters may therefore provide an estimate of one or more characteristics related to the particle object B, for example, size, composition, shape, aggregation state, interaction between particle objects, interaction between the particle object and the surrounding medium.

In the following, examples of embodiments of the invention are given. Reference is made to solutions that integrate the "first technique" as described, for example, in [5, 6], with all its possible applications and variations (see for example [8, 9]), to which is added that which is described below for each example of embodiment for the "second technique". Several different embodiments may be exploited together in the scope of the present invention to maximize the ability to reconstruct the parameters that characterize all the aspects of an object or of a population of objects that determine the scattering and the extinction of the light. The following embodiments, like the numerical values contained, are given exclusively by way of example and do not in any way represent restrictions on further embodiments.

1) Measurement of a portion of the power of the scattered radiation within a solid angle extended around the direction which forms a 90° scattering angle, identified as the angle formed between the observation direction and the direction of propagation of the incident radiation (axis z).

A configuration for carrying out such a measurement is schematically represented by the second sensor 5 positioned at the top in FIG. 1, also indicated at I. The radiation is focused within a region of space MR wherein the object B to be analyzed is brought, which scatters the radiation in the surrounding space in ways that depend on the properties thereof. The transmitted radiation beam is collected and analyzed by the first sensor 3 according to that which is described in [5, 6]. The scattered radiation is collected within a suitable solid angle and substantially centered around a 90° scattering angle from the second sensor 5.I. As illustrated in FIG. 1, it is possible to have a direct detection of the scattered power by means of sensors, for example photodiodes or bolometers. Or, it is possible to collect the scattered radiation through optics, such as lenses or mirrors, which allow the radiation to be adequately collected and sent to the sensor. Radiation may be collected by optical fibers, possibly preceded or followed by suitable optical systems. The light collection may be equipped with a system that allows substantially only the radiation coming from the region of maximum illumination to be isolated, in such a way as to isolate only the signals of interest. Such system may be composed of devices that create an image of the particle within the measurement volume on the sensor.

Particular attention must be paid to defining the scattering plane and the parameters related to it on the basis of the polarization state of the incident radiation. A simple embodiment in this sense provides for example that the radiation is linearly polarized and is collected within a solid angle centered substantially around a 90° scattering angle, located perpendicular to the plane of polarization of the incident radiation.

As may be obtained from a simple calculation by those skilled in the art by following the scheme shown in FIG. 1, the power scattered within a solid angle extending around the 90° scattering angle is proportional to the extinct power from the beam and measured hereinafter according to the scheme already known. The proportionality constant, in addition to containing factors determined by the geometry of the system and by instrumental constants, depends deterministically on the properties of the object. This means that the ratio between the power scattered at 90° and the extinct power, or else the ratio between the 90° scattering cross-section and the extinction cross-section, provides valuable information independent from the others for the determination of the properties of the object under study.

2) Measurement of the power of the scattered radiation within a solid angle extended around the 90° scattering direction, said radiation having a polarization plane different from that of the incident radiation, for example substantially perpendicular thereto. Such embodiment follows a scheme substantially similar to the scheme described above, with the difference that in this case the radiation impinged on the object has a precise polarization plane, substantially known, and that the 90° scattered radiation is collected after it passes through an optical device capable of attenuating part or all of the scattered radiation having a polarization plane parallel to that of the incident radiation. Alternatively, the radiation may be collected within a solid angle centered substantially around a 90° scattering angle in a direction substantially belonging to the polarization plane of the incident radiation.

The sensors that collect the depolarized radiation may be characterized by a higher sensitivity, since, as is well known, the power of the depolarized scattered light is much lower than the power of the polarized component. Nonetheless, there are various technological solutions that meet the requirements necessary for the detection of said component, as is clear in the specific literature, especially with regard to the depolarized dynamic scattering technique [11].

3) Measurement of a multiplicity of values of the scattered power within as many solid angles extending around as many directions each defined by its own scattering angle (as represented, for example, by the various positions of the sensors 5.III in FIG. 1). Such embodiment is limited by the need to have different measurements of fractions of the total scattered power, and therefore it may be difficult or impossible for small particles or particles with refractive indices near the index of the surrounding medium. The measurement of the scattered power at multiple angles allows direct access to an approximate measurement of the particle shape factor.

The following are examples of application of the method object of the present invention, according to some of the schemes or combinations thereof described previously. The examples are obtained by numerical simulations of systems actually measurable with the described techniques, as described well in the cited literature. The examples, the analysis methods and the numerical values contained, are given exclusively by way of example and do not in any way represent restrictions on further embodiments of the invention.

Figure 2:
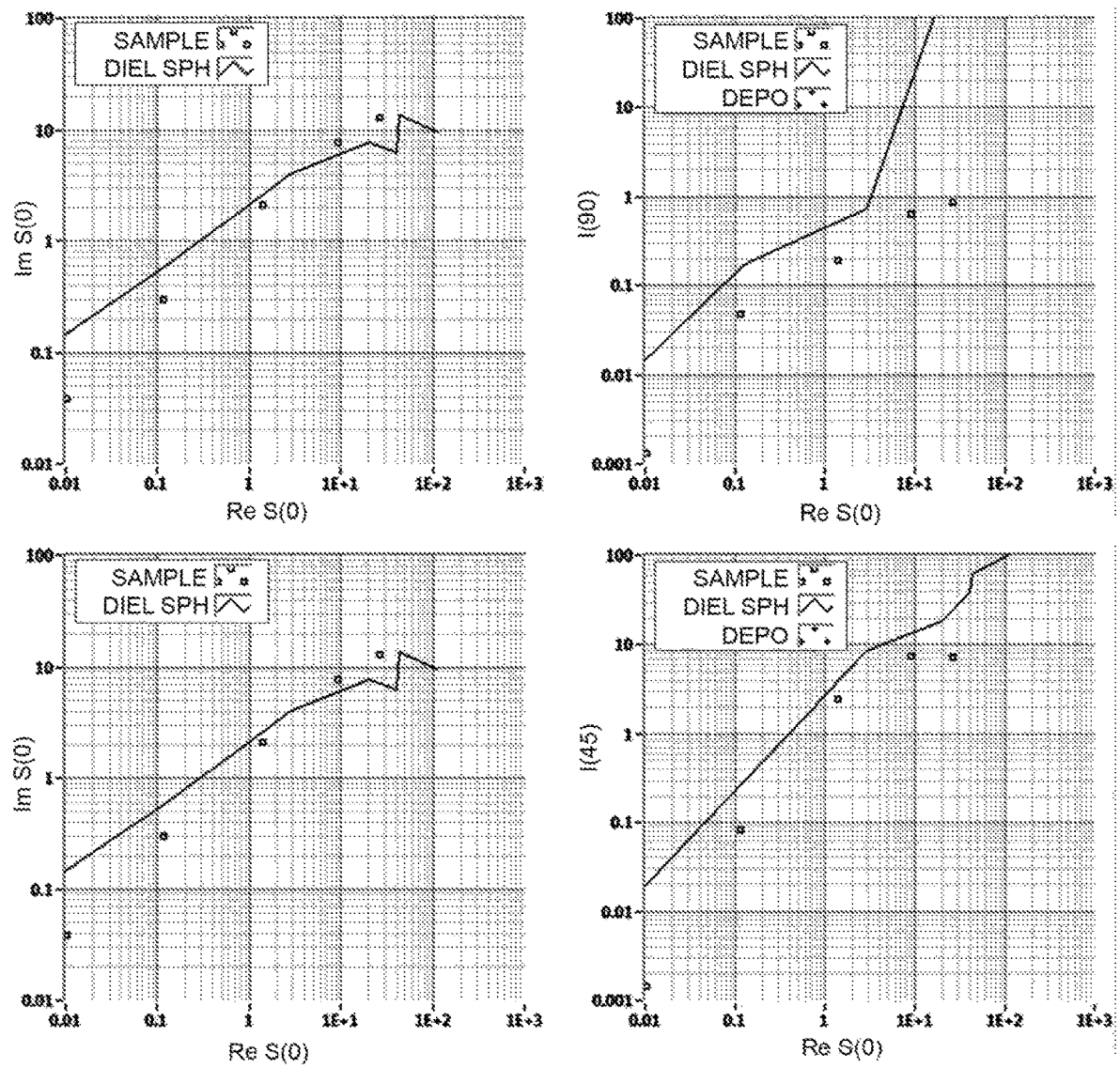
FIG. 2 shows graphs reporting the results of numerical simulations obtained for absorptive spheres with sizes between approximately 100 nm and 1000 nm. The horizontal axes of the graphs represent the real part Re S(0) of the amplitude of the scattered field at zero angle, whereas the vertical axes represent, in the boxes on the left, the imaginary part Im S(0) of the scattering amplitude and, in the boxes on the right, the intensity of the radiation scattered within an opening angle equal to 60° centered around the 90° (upper box) and 45° (lower box) scattering angle.

1.a) Characterization of the Absorption Properties of a Particle (See FIG. 2).

As is clearly shown in [6], the presence of absorption affects the parameters accessed with the "first technique". However, the absorption properties, described for example with an imaginary component of the refractive index, introduce a further variable which, added to the size and to the real part of the refractive index, prevents one from unambiguously obtaining the properties of objects even under the simplifying hypothesis of sphericity and homogeneity. In this case, a first information is represented by the refractive index—particle size pair, which may be determined using the "first technique". A second information is represented by the measurement of the scattered light power measured according to the "second technique". A third information is theoretically obtained as the power of the scattered light that would be measured by a second sensor 5 on the basis of the pair of parameters of the first information. The ratio between the second and the third information provides a fourth information necessary to adapt the third information by introducing the imaginary part of the refractive index which allows the result of the measurement to be adapted.

An example is shown in FIG. 2, where the results of numerical simulations obtained for particles with absorption are reported (squares). In the boxes on the left, the values of the quantities determined according to the "first technique" are shown; in the boxes on the right the parameter measured according to the "second technique", obtained in the example as the power scattered within a solid angle centered around the 90° (sensor 5.I in FIG. 1; upper right-hand box in FIG. 2) and 45° (sensor 5.II in FIG. 1, lower right-hand box in FIG. 2) scattering angle, as a function of a parameter that provides the power removed by the beam. In other words, in the boxes on the right the two axes represent respectively two quantities proportional to the 90° and 45° scattering cross-section and to that of extinction (in arbitrary units). The continuous line in the boxes on the left shows the expected trend for spheres of material without absorption and with an appropriate refractive index. The continuous line in the boxes on the right shows the expected value for the measurements according to the third information obtained with the "first technique". The experimental data shown in FIG. 3 of the publication [6] clearly show an example of the present case. The ratio between the values measured with the "second technique" (squares) and the theoretical values (continuous line) leads to the determination of the fourth information from which the absorption of the particle is detected through a process of adaptation of the absorption coefficient to the experimental data. Note that such ratio in the example shown is at least a factor of 2, a value that makes it easily measurable with current technologies.

Measurements were carried out with a device that simultaneously performs a measurement by using the "first technique" and the "second technique" collecting light scattered around a 45° angle on different samples of pigments with absorption. As the absorption varies, the results show variations in the parameter measured with the "second technique" of more than a factor of 10 with the same parameters measured with the "first technique", demonstrating the sensitivity of the fourth information defined above for absorption.

1.b) Characterization of the Shape of Non-Spherical Particles.

As a further example, we refer to the case of non-spherical objects, such as those discussed in [8]. In this case the information on shape is obtained in a statistical manner as explained in the literature, but it is necessary to hypothesize a refractive index for the objects and their homogeneous composition to obtain size and shape. In the absence of a hypothesis on the refractive index, in effect, the same data obtained for oblong objects could be interpreted as attributable to spheres with different refractive indexes.

Also in this case, the measurement according to the "first technique" allows one to obtain the values expected with the "second technique" in the case wherein the objects are interpreted as homogeneous spheres (third information). The ratio between the measured and the calculated values (fourth information) provides the entity with a departure from the spherical shape which, introduced in the first information, allows one to adapt the parameters of the shape to allow the results measured with the "first technique" and the "second technique" to be reproduced.

Figure 3:
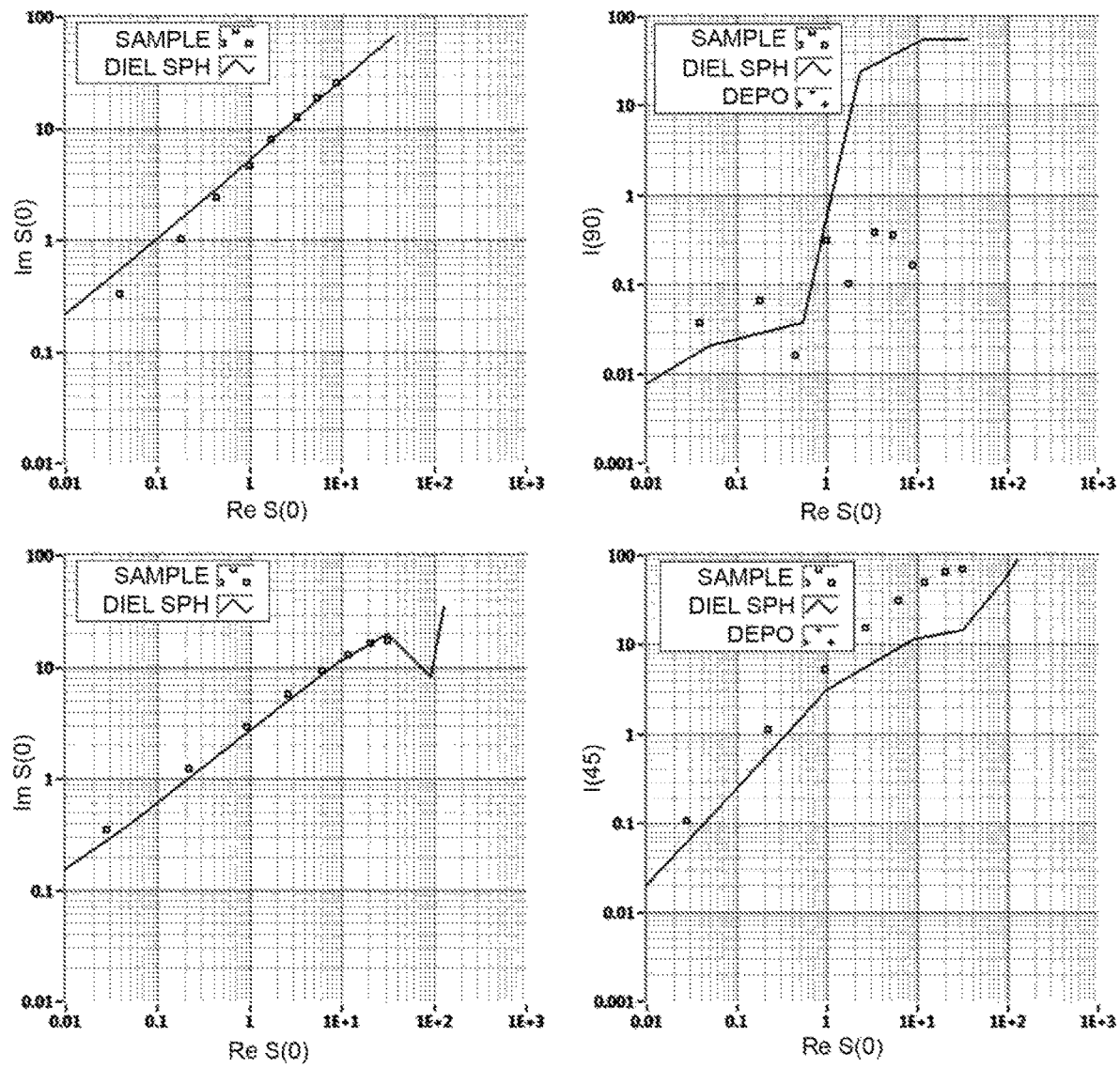
FIG. 3 shows graphs that report the results of numerical simulations obtained for elongated particles having sizes between 100 nm and 1000 nm, oriented along the direction perpendicular to the light beam (upper boxes), and oriented along the direction parallel to the beam of light (lower boxes). The horizontal axes of the graphs represent the real part Re S(0) of the amplitude of the scattered field at zero angle, whereas the vertical axes represent, in the boxes on the left, the imaginary part Im S(0) of the scattering amplitude and, in the boxes on the right, the intensity of the radiation scattered within an opening angle equal to 60° centered around the 90° (upper box) and 45° (lower box) scattering angle.

The example shown in FIG. 3 clarifies and quantifies what has been stated. In the boxes on the left the squares indicate the values of the parameters obtainable with the "first technique" for elongated objects and oriented in one case perpendicular to the direction of the radiation beam, and in another case parallel to this direction. The continuous line shows that in both cases the same values are substantially interpretable as generated by spheres with appropriate refractive index. In the boxes on the right the measurement according to the "second technique" (squares) is compared with the theoretical values (third information) generated by the measurement with the "first technique" (continuous line in the boxes on the right). Also in this case, the ratio between the two values calculated and measured reaches high values, easily measurable, which allow the adaptation of the parameter that describes the shape to the experimental data.

It should also be noted that this example also shows how, by acting on both the scattering angles, 90° and 45°, it is possible to detect the shape and also the direction of the particles.

1.c) Characterization of Non-Homogeneous Substantially Spherical Particles.

Figure 4:
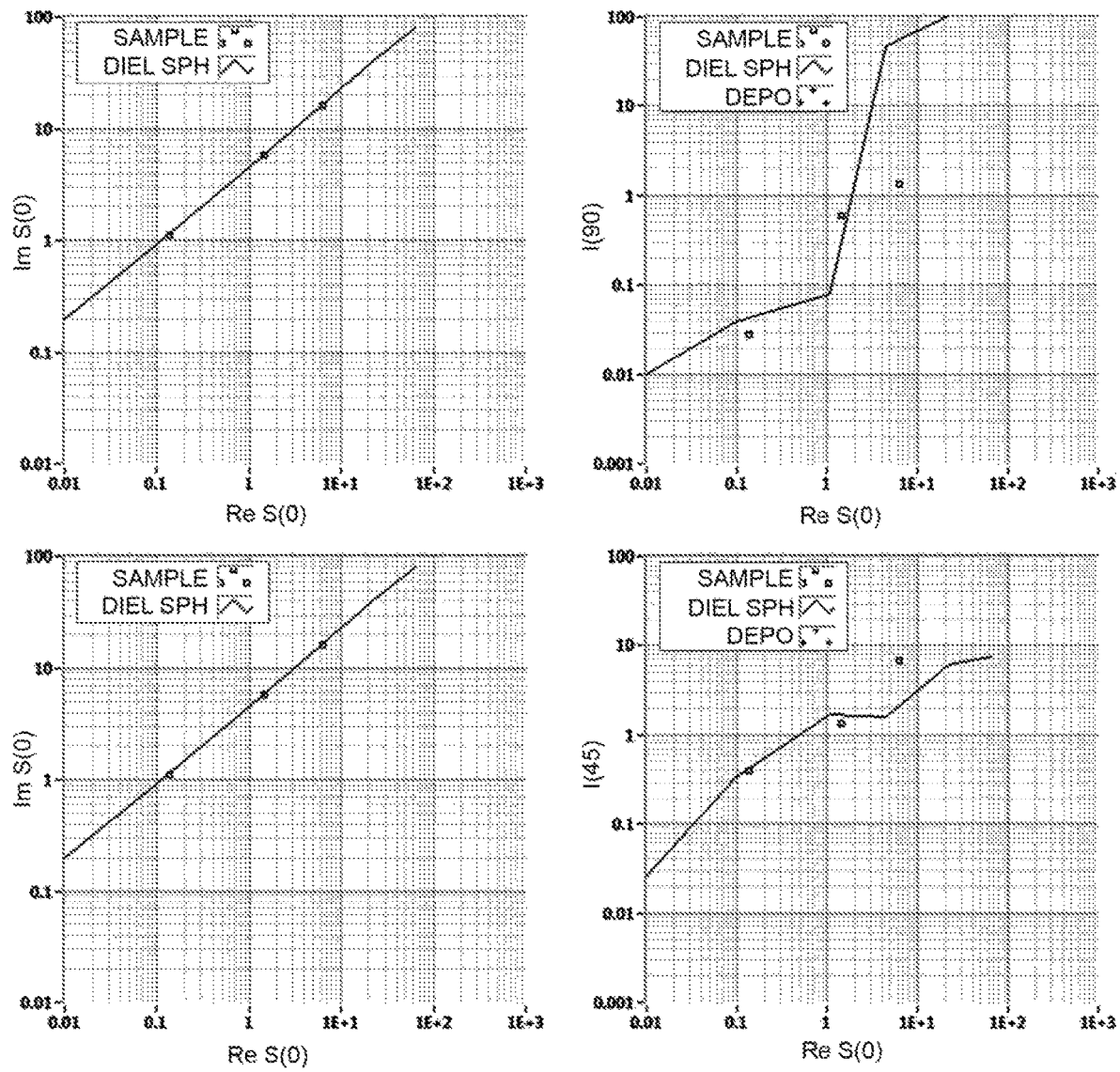
FIG. 4 shows graphs reporting the results of numerical simulations obtained for particles having sizes between approximately 100 nm and 1000 nm, with a non-homogeneous distribution of the refractive index (core-shell spheres). The horizontal axes of the graphs represent the real part Re S(0) of the amplitude of the scattered field at zero angle, whereas the vertical axes represent, in the boxes on the left, the imaginary part Im S(0) of the scattering amplitude and, in the boxes on the right, the intensity of the radiation scattered within an opening angle equal to 60° centered around the 90° (upper box) and 45° (lower box) scattering angle.

A similar case to the previous one is found when considering spherical-shaped objects, or in any case similar to the sphere from the point of view of the scattering of the light, but in which the distribution of matter is not homogeneous. An example is represented by the case wherein the polarizability of the object is dependent on the distance from the center, as happens for so-called "core-shell" objects, equipped with a spherical shell made of a material that contains a different material, including the case wherein the content corresponds to the material surrounding the object. FIG. 4 clarifies from a quantitative point of view how the present invention in its embodiment 1) allows core-shell objects to be distinguished from homogeneous spheres without any need to impose conditions on the knowledge of the refractive index as otherwise necessary and discussed in [9]. As in FIGS. 2 and 3, the boxes on the left indicate the values of the parameters accessible to the "first technique" (squares) and spheres with appropriate refractive index (continuous line). The boxes on the right show the discrepancies between the calculated and measured values, both for 90° and 45° scattering angles, highlighting the system's ability to distinguish homogeneous particles from inhomogeneous particles.

An example of characterization of non-homogeneous particles is provided in the discussion in [9] on the efficiency of 90° scattering for objects composed of a single material but with different water content. The size of the object varies with the variation of the water content, and therefore the quantity of material present in the volume unit varies as does the polarizability of the material composing the object under study. This, in the absence of independent knowledge about the nature of the object, makes it impossible to determine the filling fraction of the object, i.e., the ratio between the volume of material and the water. The measurement according to the "second technique", more particularly the ratio between the scattering cross-section at an appropriate angle (second information) and the extinction cross-section (first information), provides the information necessary to complete the characterization of the object. See the discussion in the cited work and the related figures for a quantitative characterization of this example.

Another example is provided by the discussion of the experimental data present in [10], where the dependence of the parameters measured by the "first technique" is shown for objects composed of aggregates of smaller objects. Contrary to that which is discussed in [12], the present invention would allow the non-compactness of the objects to be characterized without the prior knowledge of the refractive index.

Measurements carried out with a device that simultaneously performs a measurement by means of the "first technique" and the "second technique", collecting light scattered around a 45° angle, have shown variations of the parameter measured with the "second technique" of more than a factor of 5 with the same parameters measured with the "first technique". On this basis it was possible to distinguish the compact objects (known and calibrated) from the non-compact objects present in the sample.

Note that here water represents a special case of the medium in which the objects under study are immersed. In general, the present invention relates to the study of objects immersed in fluids, and as such the previous discussion may be generalized.

2.a) Characterization of Anisotropic Objects or Those with Internal Substructures.

It is known that depolarized scattering is generated by the presence of ordered structures, such as crystalline structures, or strongly elongated structures which have differences in their polarizability, and therefore in their refractive indices according to the directions of illumination, called optical anisotropies. Conversely, homogeneous isotropic or amorphous objects have the property of generating depolarized scattering in negligibly small quantities. Such anisotropies may have a microscopic origin at the level of the crystalline structure of the material or may originate from the non-random arrangement of the material that comprises the object under study, that is, its internal structures or shape. Both these origins have a relevance in the interpretation of data from scattered or extinct radiation measurements. In [10], for example, there is a detailed discussion of the role played by internal structures in objects formed by aggregates of smaller objects in generating depolarized scattering, but also in influencing traditional scattering. More precisely, a problem not yet resolved discussed in detail in [10] concerns the effect that the internal structures of an object have in determining its polarizability, and therefore its behavior under the action of external radiation in determining the phenomena of scattering and extinction. This highlights the need to have information on the internal structures, obtainable at least in part according to the scheme of the present invention by a more adequate characterization of objects with internal structures.

Figure 5:
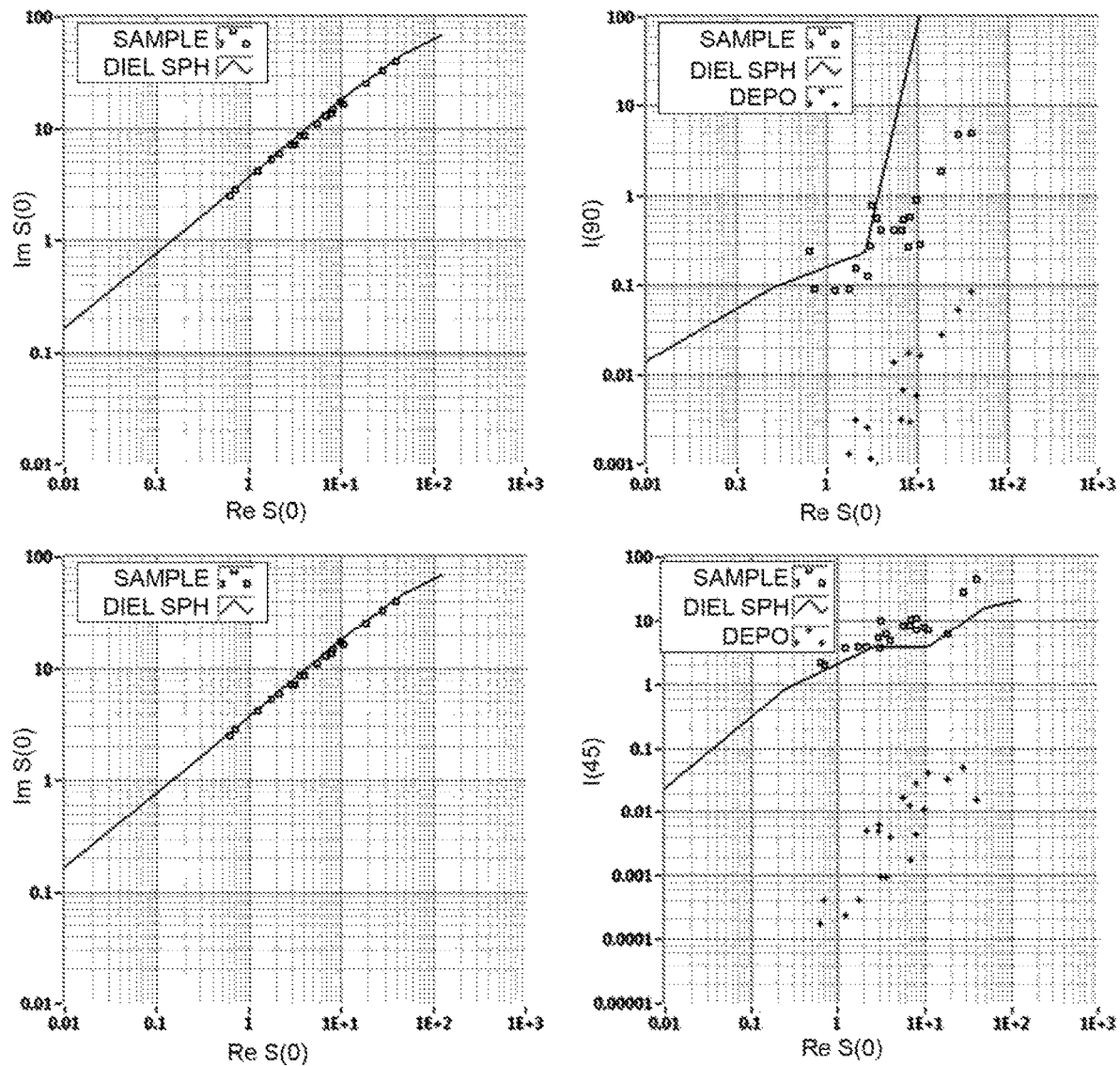
FIG. 5 shows graphs reporting the results of numerical simulations obtained for objects with internal substructures (particle aggregates), having sizes between approximately 100 nm and about 1000 nm. The horizontal axes of the graphs represent the real part Re S(0) of the amplitude of the scattered field at zero angle, while the vertical axes represent, in the boxes on the left, the imaginary part Im S(0) of the scattering amplitude and, in the boxes on the right, the intensity of the radiation scattered within an opening angle equal to 60° centered around the 90° (upper box) and 45° (lower box) scattering angle.

FIG. 5 shows an example obtained through numerical simulations carried out for objects composed of a multitude of smaller objects which form complex structures within the object under study. As may be noted on the left side, in analogy with the previous figures, the results expressed in the form of the parameters that may be obtained with the "first technique", represented by the squares, may be interpreted as homogeneous spheres with the appropriate refractive index, represented by the continuous line. The results of the measurement with the "second technique" are shown here in terms of the power scattered around a 90° and 45° angle, both in the polarized (squares) and the depolarized (crosses) components. On the basis of the measurement with the "first technique", a scattered polarized power would be obtained, represented in the boxes on the right by the continuous line. The non-zero power of the depolarized radiation scattered around 90°, or 45°, and represented here with crosses, clearly shows the existence of internal structures. The fourth information consisting of i) the ratio between the expected result (third information) and the data of the "second technique" and ii) the ratio between depolarized and polarized scattered power, thus provide the information to adapt the interpretative model of the result obtained with the "first technique".

Figure 6:
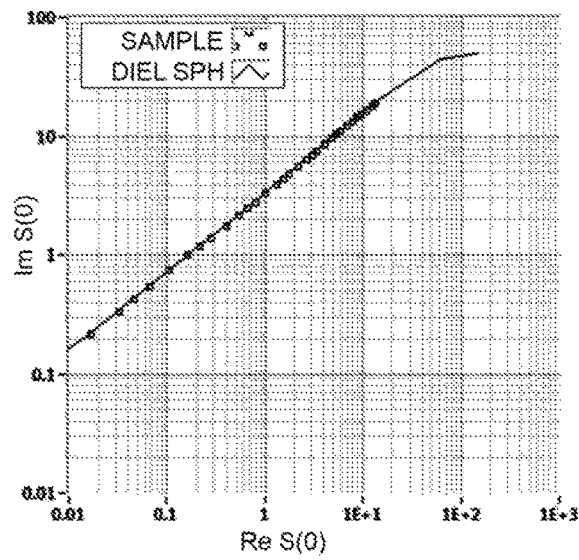
FIG. 6 shows graphs reporting the results of numerical simulations obtained for spheres with optical birefringence with sizes between approximately 100 nm and 1000 nm. The horizontal axes of the graphs represent the real part Re S(0) of the amplitude of the scattered field at zero angle, whereas the vertical axes represent, in the boxes on the left, the imaginary part Im S(0) of the scattering amplitude and, in the boxes on the right, the intensity of the radiation scattered within an opening angle equal to 60° centered around the 90° (upper box) and 45° (lower box) scattering angle.
Figure 6:
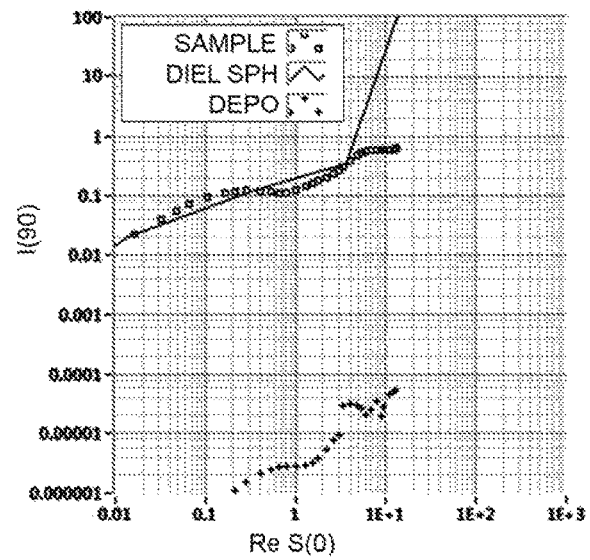
Figure 6:
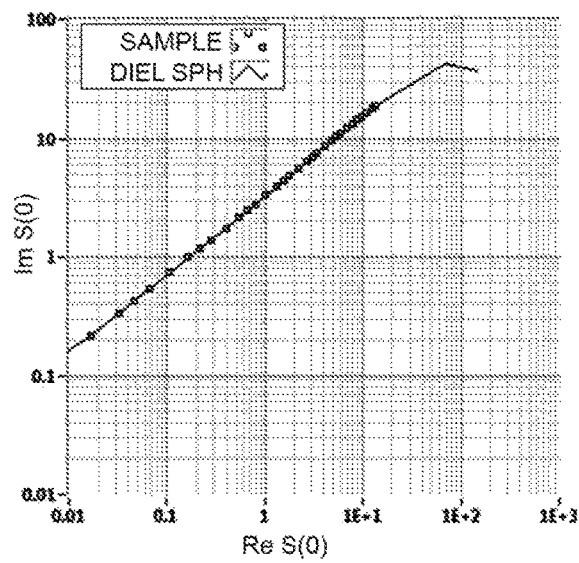
Figure 6:
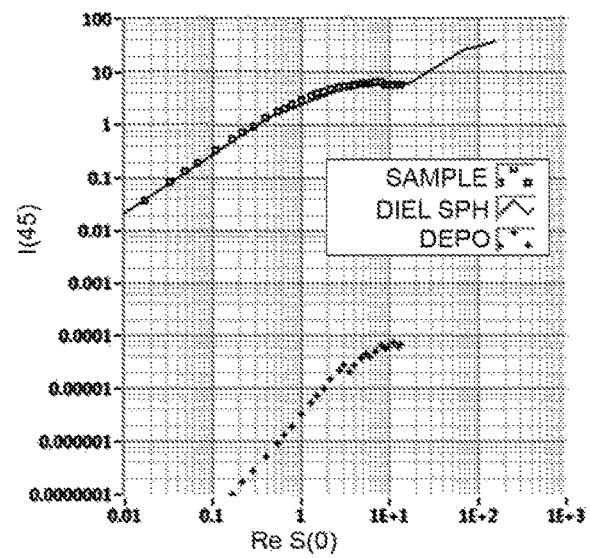

In the same way, it is possible to obtain information on the degree of crystallinity of objects, or on the so-called birefringent power of the material of which they are composed. FIG. 6 shows the results of numerical simulations which, in close analogy to what has just been discussed, show in the boxes on the left the parameters obtainable with the "first technique" for spheres of material with very small birefringence, equal to 0.002 points in the values of ordinary and extraordinary refractive indices (squares). Also in this case, the parameters are compatible with those of homogeneous and optically non-birefringent spheres (continuous line). In the boxes on the right, it is noted that, precisely because of the spherical shape and the internal homogeneity of the objects considered, also the scattering cross-section at 90° and 45° is indistinguishable in the two cases. However, the presence of a non-zero depolarized component shows the presence of a crystalline structure. Again, information from the scattering cross-section at 90° and 45° is important for determining the shape of objects, while the depolarized component shows, and measures, their internal crystallinity.

3.a) Measurement of the Internal Structure of Core-Shell Spheres.

The internal structure of the objects also influences the way wherein the radiation is distributed in space, a quantity measurable by means of a multiplicity of sensors as described in the embodiment 3) by the "second technique". By measuring single particles with the "first technique" and comparing the results obtained with the "second technique" with a model that provides the results measured with the "second technique" according to appropriate hypotheses compatible with the data obtained with the "first technique" (third information), the parameters describing the properties of the particle may be forced to adapt to both measurements.

Figure 7:
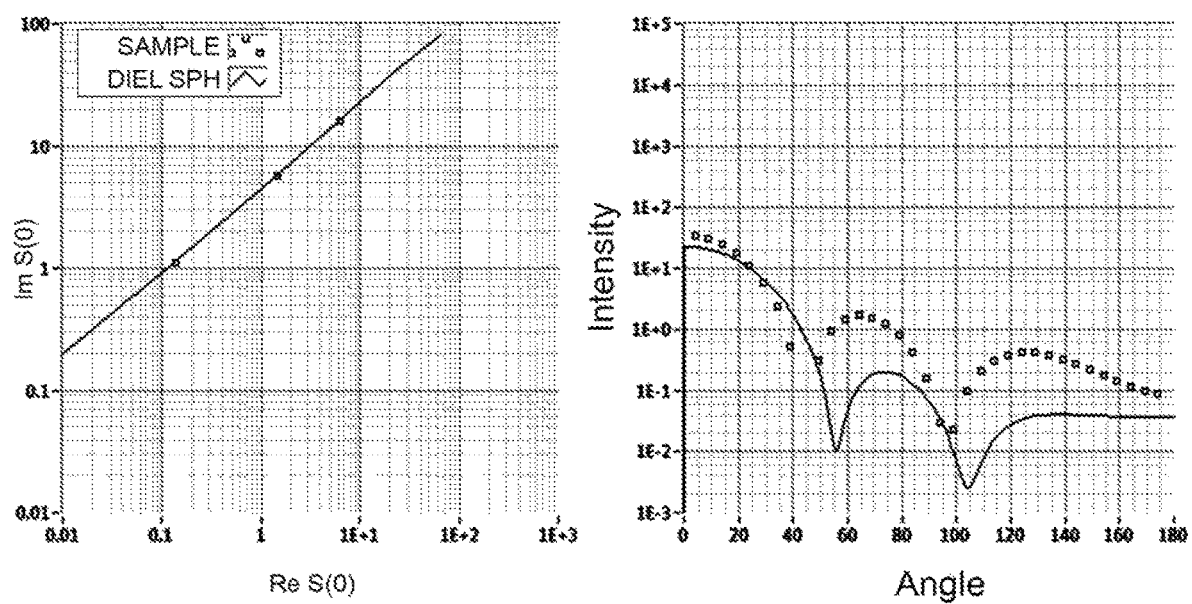
FIG. 7 shows graphs reporting the results of numerical simulations obtained for objects with a non-homogeneous distribution of the refractive index (the same core-shell spheres of FIG. 4). The horizontal axis of the box on the right represents the scattering angle, while the vertical axis represents the intensity of the scattered radiation.

FIG. 7 shows the same example discussed in FIG. 4 for the core-shell spheres. On the left are the values measured with the "first technique" (squares), which may be interpreted as homogeneous spheres of lower refractive index (continuous line). On the right are the values measured with the "second technique" (the shape factor, represented by the squares) compared to that which is expected according to the interpretative model (third information, continuous line). The discrepancy between the two, the second and third information, provides a quantitative method for determining the fourth information and forcing the interpretative model to adapt to the data of both techniques.

Figure 8:
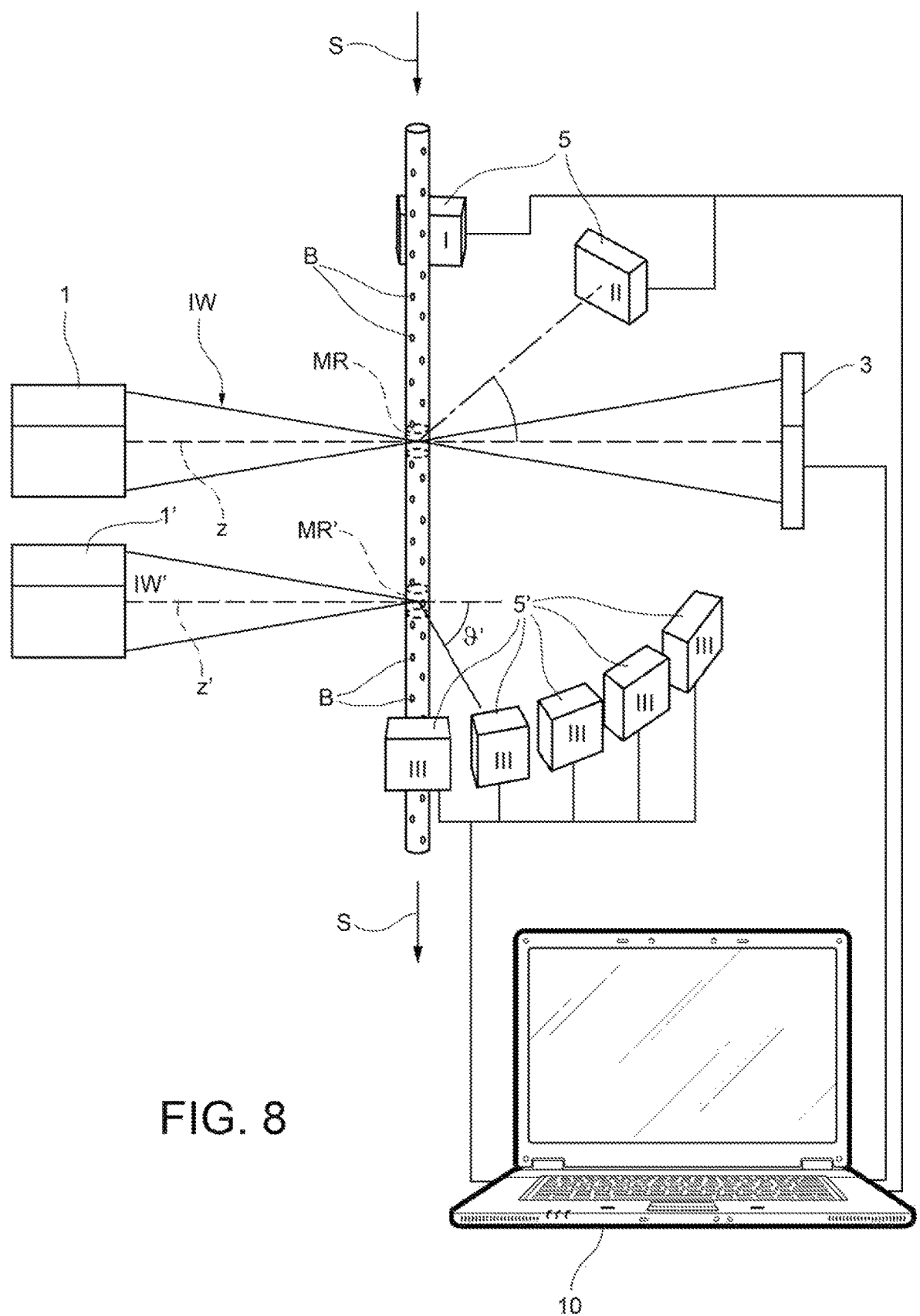
FIG. 8 is a schematic representation of an example of an apparatus capable of carrying out a method according to the invention.

FIG. 8 is a schematic representation of another example of configuration of an apparatus capable of implementing the method described above.

The same reference numbers have been assigned to elements corresponding to those of the preceding embodiment.

The configuration shown in FIG. 8 presents an additional source of electromagnetic radiation 1', adapted to generate a beam of radiation IW' which has a frequency range centered around a predetermined frequency co', which may be identical to that of the beam IW. The optical axis relative to the beam IW' is indicated at z'.

The beam IW' radiates an observation region MR' arranged downstream of the region MR along the transit path of the particles B.

While the first beam IW and the first observation region MR are associated with a first sensor 3 and (at least) a second sensor 5 analogously to the example of FIG. 1, the second beam IW' and the second region MR' is associated with only (at least) a second sensor 5' arranged at a predetermined scattering angle θ' with respect to the optical axis z'.

As with the second sensors 5 associated with the first observation region MR, each second sensor 5' associated with the second observation region MR' is adapted to measure at least one respective scattered radiation intensity value determined by a part of the scattered fraction that propagates in the direction of the single second sensor 5' (hereinafter, also referred to as the second part of the scattered fraction), and which is then intercepted by such second sensor 5'.

With respect to the second observation region MR' there is therefore no measurement of the transmitted radiation.

The information that may be inferred from the measurements made with the second sensors 5' associated with the second observation region MR' may integrate the information that may be inferred from the measurements made with the first sensor 3 and the second sensors 5' associated with the first observation region MR. The method of processing such information is similar to that previously described. The only difference consists in the fact that a part of the information concerning the out-of-axis scattered radiation is obtained with the second sensors 5 of the first observation region, and a part of such information is obtained with the second sensors 5' of the second observation region. However, this does not alter the substance of the method.

In some cases, it is possible to make sure that the measured particle B is the same in all the observation regions MR and MR', in others it is not possible. In the first case, the method is obviously applied to the single particle, while in the second case it is possible to use statistical approaches to characterize the particle population to obtain the parameters of the first technique and of the second technique.

According to further embodiments not shown, the apparatus may have a different number of observation regions.

According to other embodiments, it is possible to have several distinct beams incident on a same observation region, for example one dedicated to the measurement of parameters according to the first technique and the other dedicated to the measurement of parameters according to the second technique.

The invention claimed is:

1. A method for characterizing particle objects, the method comprising the following steps:
 a) generating one or more radiation beams propagating along respective optical axes;
 b) illuminating with said one or more radiation beams one or more observation regions that are transited by a particle object, said one or more observation regions being arranged within a Rayleigh zone of the respective radiation beams, wherein a fraction of at least one of the radiation beams, hereinafter, scattered fraction, is scattered upon interaction with the particle object transiting in the respective observation region, and another fraction, hereinafter, transmitted fraction, is transmitted along the respective optical axis through the respective observation region, without interacting with the particle object transiting in the respective observation region;
 c) collecting, with at least one first sensor comprising a plurality of sensitive elements and positioned at the optical axis of at least one of the radiation beams, an interference image determined by the interference between the transmitted fraction and a part of the scattered fraction that propagates around the direction of the optical axis, hereinafter, first part of the scattered fraction, and providing a first signal indicative of the interference image;

d) collecting, with at least one second sensor positioned at at least one non-zero scattering angle with respect to the optical axis of at least one of the radiation beams, a part of the scattered fraction that propagates at the at least one non-zero scattering angle, hereinafter, second part of the scattered fraction, providing a second signal indicative of the second part of the scattered fraction, and measuring at least one scattered radiation intensity value from said second signal;

e) calculating, from said first signal, a pair of independent quantities that define the complex field of the first part of the scattered fraction;

f) calculating, from said pair of independent quantities, a theoretical scattered radiation intensity value indicative of a scattered radiation intensity value that would be measured at the at least one non-zero scattering angle based on a theoretical model representing the particle object, the theoretical model being defined based on at least one parameter representing a characteristic of the particle object;

g) comparing the measured scattered radiation intensity value with the theoretical scattered radiation intensity value; and h) correcting said at least one parameter based on the comparison between the measured scattered radiation intensity value and the theoretical scattered radiation intensity value.

2. The method of claim 1, wherein said at least one parameter is indicative of at least one characteristic of the particle objects selected from the group consisting of: size, composition, shape, aggregation state, interaction between particle objects, interaction between a particle object and surrounding medium.

3. The method of claim 1, wherein said pair of independent quantities consists of a real part and an imaginary part of the amplitude of the scattered field, or a pair of scalar quantities dependent on the real part and the imaginary part of the amplitude of the scattered field.

4. The method of claim 1, further comprising causing a plurality of particle objects to transit one by one through the one or more observation regions, and repeating steps c)-f) for each of the particle objects.

5. The method of claim 4, wherein steps e)-g) comprise determining at least one statistical distribution of at least one of said independent quantities, measured scattered radiation intensity value and theoretical scattered radiation intensity value.

6. The method of claim 4, further comprising determining, by means of statistical analysis, at least one parameter indicative of at least one characteristic of the particle objects, selected from the group consisting of: size, composition, shape, aggregation state, interaction between particle objects, interaction between particle object and surrounding medium.

7. The method of claim 1, wherein steps c)-f) are repeated multiple times during transit of an individual particle object through one or more observation regions.

8. The method of claim 1, wherein at least one of the radiation beams has a predetermined polarization, and wherein step d) comprises measuring at least one scattered radiation intensity value determined by a polarized component of said second part of the scattered fraction, and at least one scattered radiation intensity value determined by a depolarized component of said second part of the scattered fraction.

9. The method according to claim 8, the method further comprising calculating a ratio between power of the depolarized component and power of the polarized component of said second part of the scattered fraction; and correcting the theoretical model based on the calculated ratio.

10. The method of claim 1, wherein said particle objects are suspended in a fluid.

11. An apparatus for characterizing particle objects, comprising one or more source for generating respective radiation beams propagating along respective optical axes, one or more observation regions adapted to be illuminated by the radiation beams and transited by a particle object, said one or more observation regions being arranged within a Rayleigh zone of the radiation beams, wherein a fraction of at least one of the radiation beams, hereinafter, scattered fraction, is scattered upon interaction with the particle object transiting in the respective observation region, and another fraction of at least one of the radiation beams, hereinafter, transmitted fraction, is transmitted along the respective optical axis through the respective observation region, without interacting with the particle object transiting in the respective observation region, at least one first sensor comprising a plurality of sensitive elements, said at least one sensor being configured to detecting an interference image determined by the interference between the transmitted fraction and a part of the scattered fraction that propagates around the direction of the optical axis of at least one of the radiation beams, hereinafter, first part of the scattered fraction, said at least one sensor being configured to provide a first signal indicative of the interference image;

at least one second sensor for measuring at least one scattered radiation intensity value determined by a part of the scattered fraction that propagates at a non-zero scattering angle with respect to the optical axis of at least one of the radiation beams, hereinafter, second part of the scattered fraction, said at least one second sensor being configured to provide a second signal indicative of the second part of the scattered fraction; and at least one processing unit configured to measure at least one scattered radiation intensity value from said second signal;

calculate, from said first signal, a pair of independent quantities that define the complex field of the first part of the scattered fraction;

calculate, from said pair of independent quantities, a theoretical scattered radiation intensity value indicative of a scattered radiation intensity value that would be measured at the non-zero scattering angle based on a theoretical model representing the particle object, the theoretical model being defined based on at least one parameter representing a characteristic of the particle object;

compare the measured scattered radiation intensity value with the theoretical scattered radiation intensity value; and correcting said at least one parameter based on the comparison between the measured scattered radiation intensity value and the theoretical scattered radiation intensity value.

* * * * *